United States Patent Office 3,849,564
Patented Nov. 19, 1974

3,849,564
INDOLE DERIVATIVES IN REDUCING INFLAMMATION
Marcel Descamps, Crainhem, and Henri Inion, Wemmel, Belgium, assignors to Labaz, Paris, France
No Drawing. Continuation of abandoned application Ser. No. 203,915, Dec. 1, 1971. This application Oct. 9, 1973, Ser. No. 404,251
Claims priority, application Great Britain, Dec. 9, 1970, 58,543/70
Int. Cl. A61k 27/00
U.S. Cl. 424—263        21 Claims

ABSTRACT OF THE DISCLOSURE

3-Indolyl pyridyl ketones and ketimines, particularly those with alkyl, phenyl, fluorophenyl and cyclohexyl substituents in the 2-position of the indolyl radical, and the corresponding pyridyl-N-oxide derivatives, are effective anti-inflammatory, fibrinolytic agents in mammals.

CROSS REFERENCE

This is a continuation of Ser. No. 203,915, filed Dec. 1, 1971, now abandoned.

This invention relates to indole derivatives having pharmacological activity and to pharmaceutical or veterinary compositions containing them. The invention also relates to the production of such indole derivatives. More particularly, it relates to the treatment of mammals with compounds of the formula I below to reduce inflammation and induce fibrinolysis.

GENERAL DESCRIPTION OF THE INVENTION

The pharmacologically active compounds with which the present invention is concerned are the indole derivatives represented by the general formula:

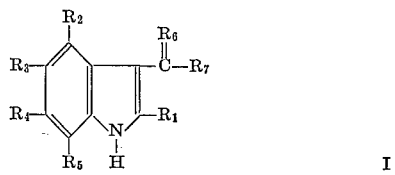

I and the pharmaceutically acceptable acid addition salts thereof, wherein $R_1$ represents hydrogen, a branched or straight-chain lower alkyl group, cyclohexyl, phenyl, fluorophenyl, chlorophenyl or methoxyphenyl; $R_2$ and $R_5$, which may be the same or different, each represent hydrogen or a branched or straight-chain lower alkyl group; $R_3$ represents hydrogen, a branched or straight-chain lower alkyl group; a chlorine atom or methoxyl radical; $R_4$ represents hydrogen, a branched or straight-chain lower alkyl group or a chlorine atom; $R_6$ represents an oxygen atom or the radical NH; and $R_7$ represents 2-pyridyl, 3-pyridyl, 4-pyridyl or the corresponding pyridyl-N-oxide radicals.

The term "lower alkyl group" is used herein as meaning an alkyl group containing from 1 to 4 carbon atoms.

Thus in accordance with one aspect of the present invention there is provided a pharmaceutical or veterinary composition comprising, as an essential active ingredient, an indole derivative as defined by formula I, or a pharmaceutically acceptable acid addition salt thereof, and a pharmaceutical carrier therefor.

In accordance with another aspect of the invention there are provided novel indole derivatives represented by formula I as defined above and their pharmaceutically acceptable acid addition salts in which $R_1$, $R_2$, $R_3$, $R_4$, $R_5$ and $R_6$ have the meanings given in formula I and $R_7$ is the pyridyl-N-oxide radical, and in which $R_6$ represents the radical NH and $R_1$, $R_2$, $R_3$, $R_4$, $R_5$ and $R_7$ have the meanings given in formula I with the proviso that when $R_2$, $R_3$, $R_4$ and $R_5$ represent hydrogen $R_1$ is other than methyl.

It is an object of this invention to provide pharmaceutically useful indole derivatives. It is another object to provide useful pharmaceutical formulations containing indole derivatives. A further object is to provide a method of preventing and reducing inflammation in mammals by administration of indole derivatives. Another object is to provide methods of synthesizing such indole compounds. These and other objects are apparent from and are achieved in accordance with the following disclosure.

DETAILED DESCRIPTION OF THE INVENTION

The compounds of the present invention have been found to possess valuable pharmacological activity in the animal body which is likely to render them useful in human and/or veterinary medicine. In particular, it has been observed that compounds of the invention exhibit marked anti-inflammatory activity in the animal body and also possess pronounced fibrinolytic properties.

Hence, in accordance with a further aspect of the invention, there is provided a method of treating inflammation in an animal host and of combatting intravascular thrombosis, comprising administering to the subject concerned an effective dose of an indole derivative represented by formula I as defined above or of a pharmaceutically acceptable acid addition salt thereof. Such an effective dose can take the form of a tablet or hard gelatin capsule containing 100 mg. of a compound of formula I administered 3 to 10 times a day to a patient weighing 60 kilos. A further method of treating the animal host is to apply an ointment containing from 1 to 10% of active principle of formula I.

Pharmacological and Physiological Activity

With regard to the anti-inflammatory activity of the compounds of the invention, comparative trials were carried out involving the use of carrageenin as inflammatory agent. One of the substances employed for purposes of comparison was a powerful anti-inflammatory agent known as indomethacine which is a substance of the same chemical family as the compounds of the invention having the same basic indole nucleus. The other substances were phenylbutazone and acetylsalicyclic acid which are not chemically related to the compounds of the invention but are recognized as possessing valuable anti-inflammatory properties.

The comparative trials were performed in accordance with the technique of Janssen. The carrageenin was injected into the plantar aponeurosis of the back paws of a group of female rats one hour after the compound to be tested had been administered by oral route. The size of the paw was measured by plethylsmograph both before and three hours after administration of the carrageenin. The anti-inflammatory activity was calculated as the percentage of reduction of the resulting edema as compared with control animals which had received the same dose of carrageenin without any anti-inflammatory agent. The $AD_{50}$ was taken as the amount of compound required to ensure a 50% reduction of the edema.

The following compounds were found to be particularly useful as anti-inflammatory agents:

3-(2-isopropyl)-indolyl 3-pyridyl ketone (Compound A)
3-(2-isopropyl)-indolyl 4-pyridyl ketone (Compound B)
3-(2-isopropyl)-indolyl 3-pyridyl ketimine (Compound C)
3-(2-isopropyl)-indolyl 4-pyridyl ketimine (Compound D)
3-(2-ethyl)-indolyl 4-pyridyl ketimine (Compound E)
3-(2-ethyl)-indolyl 3-pyridyl ketone (Compound F)
3-(2-methyl)-indolyl 3-pyridyl ketone (Compound G)

The $AD_{50}$ registered for these compounds as well as for the substances employed for comparison purposes were as follows:

| Compound: | $AD_{50}$ (mg./kg.) |
|---|---|
| A | 22 |
| B | 28 |
| C | 17 |
| D | 25 |
| E | 35 |
| F | 45 |
| G | 45 |
| Indomethacine | 4 |
| Phenylbutazone | 22 |
| Acetylsalicyclic acid | 110 |

These figures show that indomethacine is a more powerful anti-inflammatory agent than the compounds of the invention while phenylbutazone is more active than some of the latter. However, it has been found that the compounds of the invention are less toxic than indomethacine and either less toxic or more active than phenylbutazone. For example, the $LD_{50}$ in rats by intragastric route for indomethacine was found to be 22.5 mg./kg. and that for phenylbutazone 750 mg./kg. As against these figures, it was found that even at a dose as high as 4000 mg./kg. Compounds A and B were not toxic while the $LD_{50}$ for Compound D was found to be 900 mg./kg.

This means that these compounds can be administered in higher doses and over longer periods than either indomethacine or phenylbutazone without undesirable side-effects. The $LD_{50}$ for Compound C was found to be 350 mg./kg. which is lower than that registered for phenylbutazone. However, this is counterbalanced by the fact that Compound C is more active than phenylbutazone.

As another means of evaluating the utility of the compounds of the invention as anti-inflammatory agents in comparison with the three substances indicated above, trials were carried out on fasting rats in order to determine the degree to which the compounds studied produced gastric ulcers in the animals so treated. These trials showed that indomethacine, as an ulcer-producing substance, was eightly times more irritant than Compound A, while phenylbutazone and acetylsalicylic acid were respectively three times as irritant and twice as irritant as Compound A.

With regard to the fibrinolytic activity of the compounds of the invention, pharmacological trials were carried out in accordance with the procedure of Todd (J. Pathol. Bact., 78, 281, 1959) adatped to the vena cava inferior of the rat as described in Arzn. Forschung, 20, 358, 1970. In these trials, one single dose of 100 mg./kg. of each compound studied was employed, administered intraperitoneally.

Male rats weighing 150 to 200 g. and having fasted for 24 hours were divided into two groups. The animals of one group were given the above-indicated dose of the compound to be tested. The animals of the other group, which constituted the control group, were treated exactly the same way as the test animals except that the active compound present in the dose administered to the test animals was replaced by an equivalent quantity of the diluent or excipient used in the dose.

After 40 minutes, the treated animals were sacrificed simultaneously with the control animals, the veins immediately removed, rinsed with physiological salt solution frozen and cut into pieces having a thickness of 20 microns. On each piece, a film of fibrin was formed by the application of a bovine fibrinogenous solution, rich in plasminogen, and of a thrombin solution.

Most of the preparations were incubated at 37° C. for periods of time ranging from 5 to 90 minutes while some were not incubated at all. All the preparations were then fixed with formalin, stained with haematoxylin of Harris, and covered with gelatin. Microscopic examination revealed three degrees of reaction according to the length of incubation time.

Value=0: The film of fibrin was intact.

Value=1: The lysis zones in the endothelium were disseminated.

Value=2: The lysis zones were larger and more or less joined.

Value=3: The fibrin in contact with the endothelium was almost completely decomposed.

The fibrinolytic index represents the average of the values of the reactions obtained for each period of incubation.

The compounds of the invention which proved to possess the highest fibrinolytic index were Compounds A, B, D and E above together with the following:

3-(2-methyl)-indolyl 4-pyridyl ketone (Compound H)
3-(2-methyl)-indolyl 4-pyridyl ketimine (Compound I)
3-(2-ethyl)-indolyl 4-pyridyl ketone (Compound J)
3-(2-n-propyl)-indolyl 4-pyridyl ketone (Compound K)
3-[2-(4-chlorophenyl)]-indolyl 3-pyridyl ketone (Compound L)

The results obtained were as follows:

| Compound: | Fibrinoyltic index (in percent) |
|---|---|
| A | 146 |
| B | 132 |
| D | 169 |
| E | 132 |
| H | 104 |
| I | 119 |
| J | 108 |
| K | 75 |
| L | 87 |

The following substances which are recognized as possessing fibrinolytic properties in humans were submitted to the same test as that described above for purposes of comparison but they gave purely negative results:

O-(β-hydroxy-ethyl)-rutoside
Ethyl-tri-O-benzyl-3,5,6-D-glucofuranoside
Nicotinic acid It will be appreciated that for therapeutic use the compounds of the invention will normally be administered in the form of a pharmaceutical or veterinary composition in accordance with the invention. The composition may take any form appropriate to the desired mode of administration. Advantageously the composition will be made up in a dosage unit form, for example, a capsule tablet or suspension for oral administration, a suppository for rectal administration or an ointmnet for topical application.

The pharmaceutical or veterinary compositions of the invention will normally comprise, as an essential active ingredient, at least one compound of formula I or a pharmaceutically acceptable acid addition salt thereof in association with a pharmaceutical carrier therefor. The carrier may be a solid or liquid diluent or excipient of the kind normally employed in the production of medicaments ready for use, for example, lactonse, talc, magnesium stearate, microcrystalline cellulose, colloidal silica, alginic acid, gelatin, polyvinylpyrrolidone, polyethylene glycol stearate, propylene glycol, lanolin, petrolatum, cetyl alcohol, isopropyl palmitate or sodium carboxymethylcellulose. The pharmaceutically acceptable acid addition salts include the hydrochloride, hydrobromide, bisulfate, sulfate, phosphate, and related salts of strong nontoxic acids.

Insofar as the known compounds falling within the definition of formula I are concerned, it will be appreciated that the pharmaceutical and veterinary compositions in accordance with the invention do not include mere solutions of the indole derivatives in ordinary water or a common non-toxic organic solvent, where such solutions are not in dosage unit form. The invention does, however, include within its scope compositions comprising the active indole derivative in, for example, distilled water, pyrogen-free water or saline solution.

Chemical Syntheses

The compounds of formula I can be prepared by procedures described herein or by processes analogous thereto, starting from an indole represented by the following general formula:

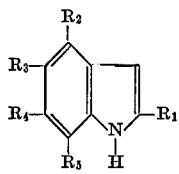

II in which $R_1$, $R_2$, $R_3$, $R_4$ and $R_5$ have the same meanings as in formula I.

The compounds of formula I in which $R_6$ represents the radical NH can be prepared by reacting an indole of formula II with 2-, 3- or 4-cyanopyridine or the corresponding N-oxide derivative thereof, in accordance with the method described by Strell and Kopp in Chemische Berichte, 91, 1621–1631 (1958), for example.

The compounds of formula I in which $R_6$ represents oxygen may be prepared by hydrolysing, for example, in accordance with the method described in the aforementioned Chemische Berichte reference, the imine obtained in the manner described above, or by reacting an indole of formula II with a dialkylamide of 2-, 3- or 4-pyridyl carboxylic acid or of the corresponding N-oxide derivative thereof, in the presence of a suitable Lewis acid such as phosphorus oxychloride and subsequently hydrolysing, in the presence of a strongly alkaline agent, the complex which forms, for example, in accordance with the Vilsmeyer Synthesis as described, for instance, in Praktische Chemie, 25, 177 (1964). These compounds may also be obtained by reacting an indole of formula II in the form of its organomagnesium derivative, obtained by reaction of the indole with an alkylmagnesium halide in accordance with known procedures, with a halide, preferably the chloride, of 2-, 3- or 4-pyridyl carboxylic acid or of the corresponding N-oxide derivative thereof and subsequently hydrolysing the resulting complex in accordance with the method described in U.S. Pat. No. 2,814,625, for example.

The starting compounds represented by formula II in which $R_1$ has the same meanings as in formula I and $R_2$, $R_3$, $R_4$ and $R_5$ represent hydrogen are known products. The other starting compounds of formula II may be prepared by different known processes according to the nature of the substituents involved. For example, those compounds in which $R_1$, $R_2$, $R_3$, $R_4$ and $R_5$ represent hydrogen or a branched or straight-chain lower alkyl group may be prepared by the Madelung Synthesis. Those in which, for example, $R_1$ represents a branched or straight-chain lower alkyl group, phenyl or a substituted phenyl, $R_3$ represents a branched or straight-chain lower alkyl group, an atom of chlorine or a methoxyl group and $R_2$, $R_4$ and $R_5$ represent hydrogen may be prepared by the Fischer Synthesis. Other processes which may be employed, according to the case, are the Reissart Synthesis, the Nenitzescu Synthesis or the method described by Piper and Stevens in the Journal of Heterocyclic Chemistry, 1966, 3, 95–99.

The following examples illustrate the preparation of indole derivatives which may be employed in the compositions of the invention.

EXAMPLE 1

Preparation of 3-(2-isopropyl)-indolyl 3-pyridyl ketone

In a 1000-ml. flask equipped with a stirrer, a vertical condenser and a dropping-funnel, 60 ml. of anhydrous ether and 3.28 g. of magnesium were placed. While stirring, 22.7 g. of methyl iodide were added drop-by-drop through the funnel. The mixture was maintained at boiling point, while being constantly stirred, until all the magnesium had been consumed. To the solution of methylmagnesium iodide thus obtained, 20.6 g. of 2-isopropylindole dissolved in 200 ml. of ether were rapidly added drop-by-drop through the dropping-funnel and the whole was maintained at boiling point for 15 minutes after which a solution of 17.4 g. of nicotinoyl chloride in 200 ml. of ether was rapidly added drop-by-drop through the funnel. The reaction medium was boiled for 2 hours and then cooled and 20 g. of sodium bicarbonate dissolved in 200 ml. of water added. Stirring was continued for 15 minutes and the reaction medium was then filtered. The insoluble product obtained was extracted with boiling ethanol. The alcoholic solution was filtered and the ethanol eliminated at reduced pressure. In this way, 23.4 g. of solid residue were obtained which, when recrystallized from isopropanol, gave 18.6 g. of 3-(2-isopropyl)-indolyl 3-pyridyl ketone, melting at 227° C. Yield: 54.2%.

EXAMPLE 2

Preparation of 3-(2-n-butyl)-indolyl 4-pyridyl ketimine

In a 1000-ml. flask fitted with a stirrer, a gas bubbling tube and a condenser, 34.6 g. of 2-n-butylindole and 20.8 g. of 4-cyanopyridine in 300 ml. of chloroform were stirred until complete dissolution. The solution thus obtained was cooled to about 0° C. by means of a cooling mixture composed of ice and salt. Hydrogen chloride was then introduced through the gas bubbling tube until the mixture was saturated after which the mixture was stirred and kept cool for 8 hours while a small flow of hydrogen chloride was maintained. The flask was then placed in a refrigerator for two days at 0° C., after which the reaction mixture was extracted with water and the solution thus obtained washed with chloroform. The aqueous solution was poured into a beaker, stirred and neutralized with ammonium hydroxide. The yellow precipitate which formed was filtered, washed over a filter with water and dried under vacuum at 50° C. In this way, 36.6 g. of crude product were obtained which, after recrystallization from a mixture of ethyl acetate and isopropanol, gave 30.2 g. of 3-(2-n-butyl)-indoly 4-pyridyl ketimine, melting at 175° C. Yield: 54.5%.

EXAMPLE 3

Preparation of 3-(2-n-butyl)-indolyl 4-pyridyl ketone

In a 2000-ml. flask, equipped with a stirrer and a condenser, 750 ml. of water, 45 ml. of concentrated hydrochloric acid and 27.7 g. of 3-(2-n-butyl)-indolyl 4-pyridyl ketimine were placed. The mixture was stirred and allowed to simmer for 30 minutes. After partial cooling, 5 g. of activated charcoal were added and the whole filtered. The solution was allowed to cool and was then neutralized with ammonium hydroxide. The rose-colored precipitate was filtered, washed over a filter with water and dried under vacuum at a temperature of 50° C. In this way, 25 g. of crude product were obtained which, after recrystallization from a mixture of ethyl acetate and isopropanol, gave 23.1 g. of 3 - (2 - n - butyl) - indolyl 4-pyridyl ketone, melting at 204° C. Yield: 83%.

EXAMPLE 4

Preparation of 3-(2-phenyl)-indolyl 3-pyridyl ketone

In a 250-ml. flask equipped with a stirrer, a condenser, a dropping-funnel and a thermometer, 17.8 g. of nicotinic acid diethylamide were placed. After stirring and cooling in an ice-bath, 6.3 ml. of phosphorus oxychlorine were rapidly added drop-by-drop through the dropping-funnel. The ice-bath was removed and 12.9 g. of 2-phenylindole were added. The reaction mixture was stirred for 4 hours at 50° C. and then for about 12 hours at room temperature. The reaction product was decomposed with 150 ml. of water and 33 g. of sodium hydroxide were added to the suspension thus obtained, which was then heated to boiling while being stirred. A layer of orange-colored oil was separated out which partially crystallized after cooling and standing. The supernatant water was decanted off and the product taken up in hot isopropanol. The liquid was filtered and the insoluble residue was washed over a filter with isopropanol and dried under vacuum. In this way, 7 g. of crude product were obtained which, after recrystallization from dioxan, gave 5.3 g. of 3-(2-phenyl)-indolyl 3-pyridyl ketone, melting at 268–270° C. Yield: 27%.

The following compounds were prepared by utilizing the various processes described in the respective foregoing examples.

KETIMINES

| Compound: | Melting Point ° C. |
|---|---|
| 3-(2-methyl)-indolyl 2-pyridyl ketimine | 240 |
| 3-(2-methyl)-indolyl 3-pyridyl ketimine | 189 |
| 3-(2-methyl)-indolyl 4-pyridyl ketimine | 224 |
| 3-(2-methyl-5-chloro)-indolyl 3-pyridyl ketimine | 169 |
| 3-(2-ethyl)-indolyl 2-pyridyl ketimine | 192 |
| 3-(2-ethyl)-indolyl 4-pyridyl ketimine | 190 |
| 3-(2-n-propyl)-indoyl 2-pyridyl ketimine | 147 |
| 3-(2-n-propyl)-indolyl 3-pyridyl ketimine | 165 |
| 3-(2-n-propyl)-indolyl 4-pyridyl ketimine | 149 |
| 3-(2-isopropyl)-indolyl 2-pyridyl ketimine | 215 |
| 3-(2-isopropyl)-indolyl 3-pyridyl ketimine | 220 |
| 3-(2-isopropyl)-indolyl 4-pyridyl ketimine | 193 |
| 3-(2-isopropyl-7-methyl)-indolyl 3-pyridyl ketimine | 182 |
| 3-(2-n-butyl)-indolyl 2-pyridyl ketimine | 134 |
| 3-(2-isobuytl)indolyl 3-pyridyl ketimine | 212 |
| 3-(2-isobutyl)-indolyl 4-pyridyl ketimine | 208 |
| 3-(2-cyclohexyl)-indolyl 3-pyridyl ketimine | 234 |
| 3-(2-phenyl)-indolyl 4-pyridyl ketimine | 264 |

KETONES

| Compound: | Melting Point ° C. |
|---|---|
| 3-indolyl 3-pyridyl ketone | 212 |
| 3-(2-methyl)-indolyl 2-pyridyl ketone | 205 |
| 3-(2-methyl)-indolyl 3-pyridyl ketone | 203 |
| 3-(2-methyl)-indolyl 4-pyridyl ketone | 236 |
| 3-(2-methyl-5-methoxy)-indolyl 3-pyridyl ketone | 190 |
| 3-(2-methyl-5-chloro)-indolyl 2-pyridyl ketone | 218 |
| 3-(2-methyl-5-chloro)-indolyl 3-pyridyl ketone | 212 |
| 3-(2-methyl-5-chloro)-indolyl 4-pyridyl ketone | 266 |
| 3-(2-methyl-6-chloro)indolyl 2-pyridyl ketone | 238 |
| 3-(2-methyl-6-chloro)-indolyl 3-pyridyl ketone | 239 |
| 3-(2-methyl-6-chloro)-indolyl 4-pyridyl ketone | 251 |
| 3-(2-ethyl)-indoyl 2-pyridyl ketone | 172 |
| 3-(2-ethyl)-indolyl 3-pyridyl ketone | 204 |
| 3-(2-ethyl)-indolyl 4-pyridyl ketone | 214 |
| 3-(2-n-propyl)indolyl 2-pyridyl ketone | 171 |
| 3-(2-n-propyl)-indolyl 3-pyridyl ketone | 191 |
| 3-(2-n-propyl)-indolyl 4-pyridyl ketone | 196 |
| 3-(2-isopropyl)-indolyl 2-pyridyl ketone | 166 |
| 3-(2-isopropyl)-indolyl 4-pyridyl-1-oxide ketone | 214 |
| 3-(2-isopropyl)indolyl 4-pyridyl ketone | 248 |
| 3-(2-isopropyl-4-methyl)-indolyl 3-pyridyl ketone | 240 |
| 3-(2-isopropyl-5-methyl)-indolyl 3-pyridyl ketone | 208 |
| 3-(2-isopropyl-6-methyl)-indolyl 3-pyridyl ketone | 191 |
| 3-(2-isopropyl-7-methyl)-indolyl 3-pyridyl ketone | 206 |
| 3-(2-isopropyl-5-methoxy)-indolyl 3-pyridyl ketone | 176 |
| 3-(2-n-butyl)-indolyl 3-pyridyl ketone | 174 |
| 3-(2-isobutyl)-indolyl 3-pyridyl ketone | 165 |
| 3-(2-isobutyl)-indolyl 4-pyridyl ketone | 231 |
| 3-(2-tertiobutyl)-indolyl 3-pyridyl ketone | 212 |
| 3-(2-cyclohexyl)-indolyl 3-pyridyl ketone | 230 |
| 3-(2-phenyl)-indolyl 2-pyridyl ketone | 241 |
| 3-(2-phenyl)-indolyl 4-pyridyl ketone | 310 |
| 3-[2-(4-fluorophenyl)]-indolyl 2-pyridyl ketone | 263 |
| 3-[2-(4-fluorophenyl)]-indolyl 3-pyridyl ketone | 260 |
| 3-[2-(4-fluorophenyl)]-indolyl 4-pyridyl ketone | 270 |
| 3-[2-(4-chlorophenyl)]-indolyl 2-pyridyl ketone | 268 |
| 3-[2-(4-chlorophenyl)]-indolyl 3-pyridyl ketone | 261 |
| 3-[2-(4-chlorophenyl)]-indolyl 4-pyridyl ketone | 254 |
| 3-[2-(4-methoxyphenyl)]-indolyl 3-pyridyl ketone | 208 |

EXAMPLE 5

Tablets were prepared by compressing ungranulated powders of the following ingredients in accordance with known pharmaceutical techniques:

| | Mg. |
|---|---|
| 3-(2-isopropyl)-indolyl 3-pyridyl ketone | 100 |
| Lactose | 142 |
| Microcrystalline cellulose | 48 |
| Colloidal silica | 1 |
| Alginic acid | 6 |
| Magnesium stearate | 3 |
| | 300 |

EXAMPLE 6

Hard gelatin capsules containing the following ingredients were prepared in accordance with known pharmaceutical techniques:

| | Mg. |
|---|---|
| 3-(2-isopropyl)-indolyl 3-pyridyl ketone | 100 |
| Lactose | 100 |
| Colloidal silica | 5 |
| | 205 |

We claim:
1. Method of treating a mammal to reduce inflammation which comprises administering thereto 100 mg. to 1000 mg. per 60 kg. of body-weight per day of a compound of the formula

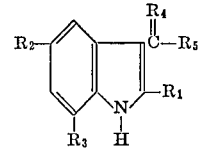

or a pharmaceutically acceptable acid addition salt thereof, wherein $R_5$ represents 2-pyridyl, 3-pyridyl or 4-pyridyl and wherein $R_2$, $R_3$, $R_4$ and $R_5$ are such that:
(a) in the compounds wherein $R_5$ represents 2-pyridyl, when $R_4$ represents oxygen, $R_1$ represents ethyl and $R_2$ and $R_3$ represent hydrogen, and when $R_4$ represents NH, $R_1$ represents methyl and $R_2$ and $R_3$ represent hydrogen;

(b) in the compounds wherein $R_5$ represents 3-pyridyl, when $R_1$ represents methyl, ethyl, n-propyl or isopropyl, $R_2$ and $R_3$ represent hydrogen and $R_4$ represents oxygen, when $R_2$ represents methoxyl, $R_1$ represents methyl or isopropyl, $R_3$ represents hydrogen and $R_4$ represents oxygen, when $R_3$ represents methyl, $R_1$ represents isopropyl, $R_2$ represents hydrogen and $R_4$ represents oxygen or NH, and when $R_1$ represents methyl, n-propyl, isopropyl or isobutyl, $R_2$ and $R_3$ represent hydrogen and $R_4$ represents NH;

(c) in the compounds wherein $R_5$ represents 4-pyridyl, when $R_1$ represents isopropyl, $R_2$ and $R_3$ represent hydrogen and $R_4$ represents oxygen or NH, and when $R_1$ represents methyl, ethyl or n-propyl, $R_2$ and $R_3$ represent hydrogen and $R_4$ represents NH.

2. Method of claim 1 wherein $R_1$ is isopropyl, $R_4$ is oxygen, $R_5$ is 3-pyridyl and $R_2$ and $R_3$ are hydrogen.

3. Method of claim 1 wherein $R_1$ is isopropyl, $R_4$ is oxygen, $R_5$ is 4-pyridyl and $R_2$ and $R_3$ are hydrogen.

4. Method of claim 1 wherein $R_1$ is isopropyl, $R_4$ is NH, $R_5$ is 3-pyridyl and $R_2$ and $R_3$ are hydrogen.

5. Method of claim 1 wherein $R_1$ is isopropyl, $R_4$ is NH, $R_5$ is 4-pyridyl and $R_2$ and $R_3$ are hydrogen.

6. Method of claim 1 wherein $R_1$ is ethyl, $R_4$ is NH, $R_5$ is 4-pyridyl and $R_2$ and $R_3$ are hydrogen.

7. Method of claim 1 wherein $R_1$ is ethyl, $R_4$ is oxygen, $R_5$ is 3-pyridyl and $R_2$ and $R_3$ are hydrogen.

8. Method of claim 1 wherein $R_1$ is methyl, $R_4$ is oxygen, $R_5$ is 3-pyridyl and $R_2$ and $R_3$ are hydrogen.

9. A pharmaceutical composition for treating a mammal to reduce inflammation comprising a compound as defined in claim 1 in association with a pharmaceutical carrier for oral administration constituting a dosage unit containing 100 mg. to 300 mg. of said compound.

10. A pharmaceutical composition comprising a compound as defined in claim 9 in association with a pharmaceutical carrier for topical administration constituting a dosage unit containing 1% to 10% of said compound.

11. A pharmaceutical composition as defined by claim 10 wherein $R_1$ is isopropyl, $R_4$ is oxygen, $R_5$ is 3-pyridyl or 4-pyridyl and $R_2$ and $R_3$ are hydrogen.

12. A pharmaceutical composition as defined in claim 10 wherein $R_1$ is isopropyl, $R_4$ is NH, $R_5$ is 3-pyridyl or 4-pyridyl and $R_2$ and $R_3$ are hydrogen.

13. A pharmaceutical composition as defined in claim 10 wherein $R_1$ is ethyl, $R_4$ is NH, $R_5$ is 4-pyridyl and $R_2$ and $R_3$ are hydrogen.

14. A pharmaceutical composition as defined in claim 10 wherein $R_1$ is ethyl, $R_4$ is oxygen, $R_5$ is 3-pyridyl and $R_2$ and $R_3$ are hydrogen.

15. A pharmaceutical composition as defined in claim 10 wherein $R_1$ is methyl, $R_4$ is oxygen, $R_5$ is 3-pyridyl and $R_2$ and $R_3$ are hydrogen.

16. A pharmaceutical composition comprising a compound as defined in claim 1 in association with a pharmaceutical carrier for oral administration constituting a dosage unit containing 1% to 10% of said compound.

17. A pharmaceutical composition as defined by claim 16 wherein $R_1$ is isopropyl, $R_4$ is oxygen, $R_5$ is 3-pyridyl or 4-pyridyl and $R_2$ and $R_3$ are hydrogen.

18. A pharmaceutical composition as defined in claim 16 wherein $R_1$ is isopropyl, $R_4$ is NH, $R_5$ is 3-pyridyl or 4-pyridyl and $R_2$ and $R_3$ are hydrogen.

19. A pharmaceutical composition as defined in claim 16 wherein $R_1$ is ethyl, $R_4$ is NH, $R_5$ is 4-pyridyl and $R_2$ and $R_3$ are hydrogen.

20. A pharmaceutical composition as defined in claim 16 wherein $R_1$ is ethyl, $R_4$ is oxygen, $R_5$ is 3-pyridyl and $R_2$ and $R_3$ are hydrogen.

21. A pharmaceutical composition as defined in claim 16 wherein $R_1$ is methyl, $R_4$ is oxygen, $R_5$ is 3-pyridyl and $R_2$ and $R_3$ are hydrogen.

References Cited
UNITED STATES PATENTS

| | | | |
|---|---|---|---|
| 3,184,466 | 5/1965 | Herring et al. | 424—263 |
| 3,190,889 | 6/1965 | Shen | 424—263 |

STANLEY J. FRIEDMAN, Primary Examiner

U.S. Cl. X.R.

260—296 B